(12) United States Patent
Manadhata et al.

(10) Patent No.: US 8,621,233 B1
(45) Date of Patent: Dec. 31, 2013

(54) MALWARE DETECTION USING FILE NAMES

(75) Inventors: Pratyusa K. Manadhata, Marina Del Ray, CA (US); Mark Kevin Kennedy, Redondo Beach, CA (US); Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 928 days.

(21) Appl. No.: 12/687,071

(22) Filed: Jan. 13, 2010

(51) Int. Cl.
*G06F 21/00* (2013.01)
(52) U.S. Cl.
USPC ............... 713/188; 726/22; 726/25; 709/224
(58) Field of Classification Search
USPC .................. 726/22, 24, 25; 709/224; 713/188
See application file for complete search history.

(56) References Cited

U.S. PATENT DOCUMENTS

| 8,060,521 B2 * | 11/2011 | Lemar et al. ................... 707/759 |
| 8,176,555 B1 * | 5/2012 | Schreiner et al. ............... 726/23 |
| 2008/0120319 A1 * | 5/2008 | Drews et al. ................... 707/102 |

OTHER PUBLICATIONS

Bose, A., "Propagation, Detection and Containment of Mobile Malware," Dissertation, University of Michigan, 2008, 167 pages.
Cohen, W.W. et al., "A Comparison of String Distance Metrics for Name-Matching Tasks," 2003, American Association for Artificial Intelligence, 6 pages.
Idika, N. et al., "A Survey of Malware Detection Techniques," Department of Computer Science, Purdue University, Feb. 2, 2007, pp. 1-48.
Karnik, A. et al., "Detecting Obfuscated Viruses Using Cosine Similarity Analysis," Proceedings of the First Asia International Conference on Modelling & Simulation, IEEE, Mar. 27-30, 2007, 6 pages.
Paul, N., "Disk-Level Behavioral Malware Detection," Dissertation, University of Virginia, May 2008, pp. 155 pages.

* cited by examiner

*Primary Examiner* — Eleni Shiferaw
*Assistant Examiner* — Paul Callahan
(74) *Attorney, Agent, or Firm* — Fenwick & West LLP

(57) ABSTRACT

Descriptions of files detected at endpoints are submitted to a security server. The descriptions describe the names of the files and unique identifiers of the files. The security server uses the unique identifiers to identify files having different names at different endpoints. For a given file having multiple names, the names are processed to account for name differences unlikely to have been caused by malware. The processed names for the file are analyzed to determine the amount of dissimilarity among the names. This analysis is used to generate a score indicating a confidence that the computer file contains malicious software, where a greater amount of dissimilarity among the names generally indicates a greater confidence that the computer file contains malicious software. The score is weighted based on file name frequency, the age of the file, and the prevalence of the file. The weighted score is used to determine whether the computer file contains malicious software.

17 Claims, 5 Drawing Sheets

MALWARE DETECTION USING FILE NAMES

BACKGROUND OF THE INVENTION

1. Field of the Invention

This invention pertains in general to computer security and in particular to detecting malicious software.

2. Description of the Related Art

There is a wide variety of malicious software (malware) that can attack modern computers. Malware threats include computer viruses, worms, Trojan horse programs, spyware, adware, crimeware, and phishing websites. Malware can, for example, surreptitiously capture important information such as logins, passwords, bank account identifiers, and credit card numbers. Similarly, the malware can provide hidden interfaces that allow the attacker to access and control the compromised computer.

Modern malware is often targeted and delivered to only a relative handful of computers. For example, a Trojan horse program can be designed to target computers in a particular department of a particular enterprise. Such malware is difficult for security software to detect because there are fewer instances of the same malware, and the security software might not be configured to recognize it. Moreover, even mass-distributed malware is becoming harder to detect because the malware can contain polymorphisms designed to evade detection.

In response to the increasing difficulty of detecting malware, security software is evolving toward reputation-based systems. Such systems evaluate the reputation of an entity such as a file, and use the reputation to determine whether the entity constitutes malware. Reputation systems often work well with entities that have a high prevalence, i.e., they easily identify malware detected on many endpoints. However, reputation systems work less well for entities with low prevalence because there is less confidence in the determined reputations of the entities.

BRIEF SUMMARY

The above and other issues are addressed by a computer-implemented method, computer system, and computer-readable storage medium for determining whether a computer file contains malware. Embodiments of the method comprise identifying a computer file stored on a plurality of different endpoints and having a plurality of different names. The method further comprises analyzing the plurality of different names for the computer file to generate a score indicating a confidence that the computer file contains malicious software and determining whether the computer file contains malicious software responsive at least in part to the score.

Embodiments of the computer system comprise a computer-readable storage medium storing executable computer program instructions. The computer program instructions comprise instructions for identifying a computer file stored on a plurality of different endpoints and having a plurality of different names. The computer program instructions additionally comprise instructions for analyzing the plurality of different names for the computer file to generate a score indicating a confidence that the computer file contains malicious software and determining whether the computer file contains malicious software responsive at least in part to the score. The computer system further comprises a processor for executing the computer program instructions.

Embodiments of the computer-readable storage medium store executable computer program instructions for determining whether a computer file contains malicious code. The instructions comprising instructions for submitting file descriptions describing attributes of computer files detected on an endpoint to a security server, the attributes comprising unique identifiers of the computer files and the names of the computer files. The instructions also comprise instructions for receiving, from the security server, an indication of whether a computer file for which a file description was submitted contains malicious software, the indication determined responsive to an analysis of unique identifiers and names of computer files described by file descriptions submitted by a plurality of different endpoints and for, responsive to the received indication indicating that the computer file contains malicious software, remediating the malicious software.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
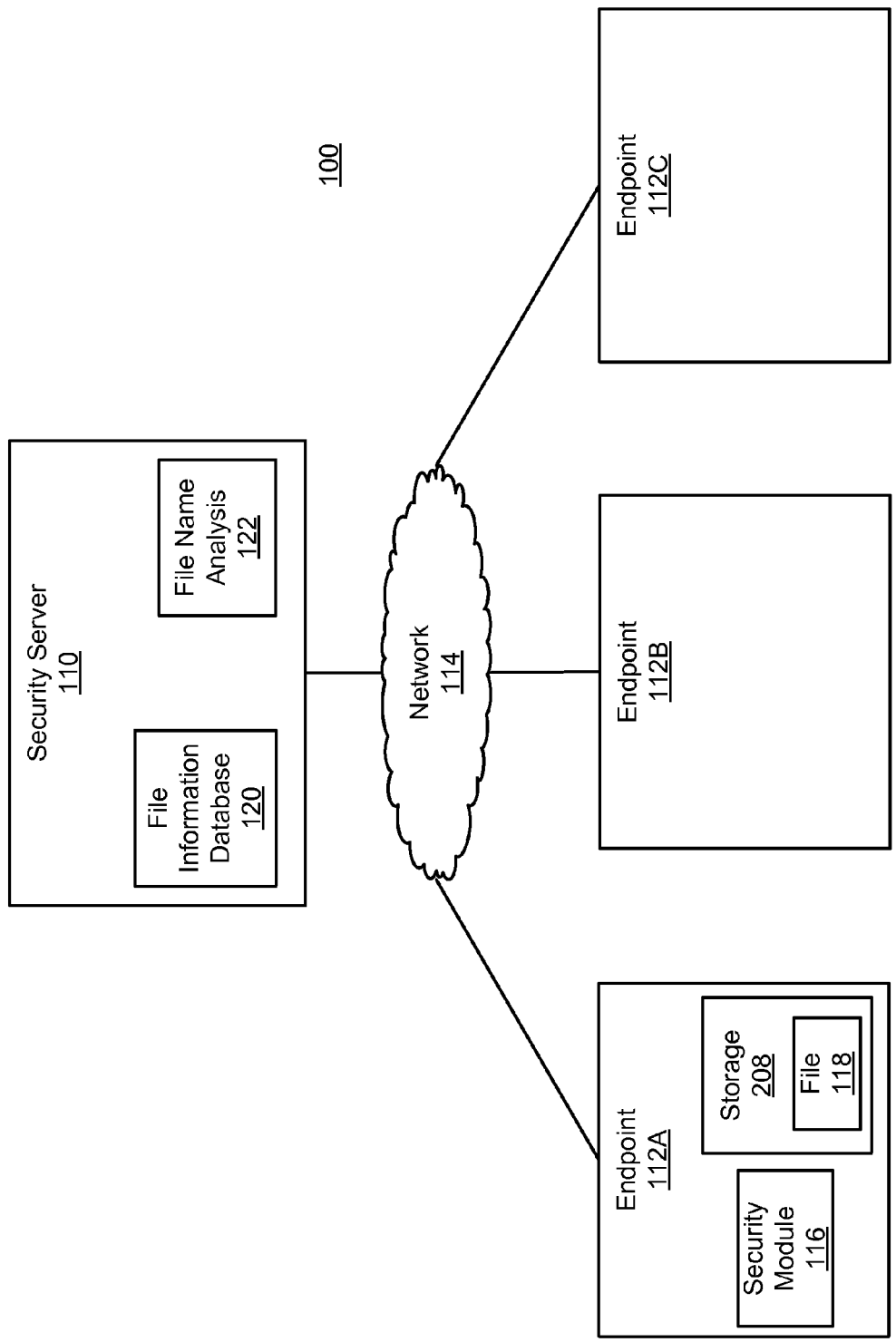
FIG. 1 is a high-level block diagram of a computing environment according to one embodiment.

FIG. 1 is a high-level block diagram of a computing environment 100 according to one embodiment. FIG. 1 illustrates a security server 110 and endpoints 112 connected by a network 114. Three endpoints 112 are illustrated in FIG. 1 in order to simplify and clarify the description. Embodiments of the computing environment 100 can have thousands or millions of endpoints 112. Some embodiments also have multiple security servers 110.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

The network 114 represents the communication pathways between the security server 110, endpoints 112, other entities on the network. In one embodiment, the network 114 is the Internet and uses standard communications technologies and/or protocols. Thus, the network 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

In one embodiment, an endpoint 112 is a computer used by one or more users to perform activities including browsing web sites on the network 114 and downloading, installing, updating, and/or executing applications. The endpoint 112, for example, can be a personal computer executing a web browser such as MICROSOFT INTERNET EXPLORER that allows the user to retrieve and execute content from web servers and other computers on the network 114. In other embodiments, the endpoint 112 is a network-capable device other than a computer, such as a personal digital assistant (PDA), a mobile telephone, a pager, a television "set-top box," a router, or any other device that encounters network traffic including executable content.

For clarity, FIG. 1 illustrates internal details of only endpoint 112A. The other endpoints 112B, 112C can have similar internal details. The endpoint 112A includes a security module 116 that provides security to the endpoint by detecting malware and performing other security-related tasks. The endpoint 112 also includes a storage device 208 that stores files 118 used by the endpoint. A file stored on the storage device 208 has various attributes associated with it, including its name, path (i.e., the location of the file on the storage device 208), size, and contents.

In one embodiment, the security module 116 detects files 118 stored on the storage device 208 and sends descriptions of the files to the security sever 110. The descriptions describe attributes of the files. For example, a description of a file can include the file's name, the path where the file is located, and a unique identifier derived from the contents of the file. The unique identifier can be a cryptographic hash of the file's contents, such as a Secure Hash Algorithm-2 (SHA-2) or Message Digest-5 (MD5) hash. Since the identifier is based on the file's contents, two files with the same content will have the same identifier, even if other attributes of the files differ. In some embodiments, the security module 116 sends descriptions of only a subset of files detected at the endpoint 112 to the security server 110, such as only descriptions of files that contain executable code.

The security module 116 at the endpoint 112 also receives information from the security server 110 used for detecting malware at the endpoint. In one embodiment, the received information includes indications of whether specific files 118 found at the endpoint 112 contain malware. For example, the security module 116 can receive an identifier of a file determined by the security server 110 to contain malware. The received information can also include information assisting the security module 116 in determining whether particular files at the endpoint 112 contain malware, such as reputation information indicating a likelihood of whether a file contains malware. In addition, the received information can include signatures for detecting known malware, heuristics for detecting unknown malware, and instructions for remediating malware detected at the endpoint 112. The security module 116 uses the received information to detect and remediate malware at the endpoint 112.

The security server 110 uses the file descriptions received from the endpoints 112 to determine whether files detected at the endpoints 112 contain malware. One or more of the functions of the security server 110 can be provided by a cloud computing environment. As used herein, cloud computing refers to a style of computing in which dynamically scalable and often virtualized resources are provided as a service over the network 114.

An embodiment of the security server 110 uses the received file identifiers and file names to determine whether the identified files contain malware. Different instances of the same malware often use dissimilar names in order to evade detection. Different instances of the same legitimate (i.e., non-malicious) software may also have different names, but the names are often similar. If instances of the same file have different names, the security server 110 determines a score indicating the amount of dissimilarity among the names and uses the score as a signal to determine whether the file contains malware. In general, the greater the dissimilarity among the names for a file, the greater the confidence that the file contains malware. The security server 110 reports the malware determinations to the security modules 116 of the endpoints 112.

The security server 110 includes a file information database 120 for storing information about files detected at the endpoints 112. The stored information includes the file descriptions received from the security modules 116 and/or other sources. The stored information can also include descriptions of which files were detected on which endpoints 112, the times and dates that the files were detected, malware determinations made by the security server 110 and endpoints 112, and other data used during the operation of the security server 110.

A file name analysis module 122 (called the "analysis module" herein) uses the information in the file information database 120 to determine whether files detected at the endpoints 112 contain malware. In one embodiment, the analysis module 122 identifies a file by its unique identifier, and determines the number of different file names for the file used at the various endpoints 112 at which it was detected. The file name analysis module 122 determines the amount of dissimilarity among the different file names. In addition, the analysis module 122 considers other factors that might account for at least some of the different file names in order to reduce potential false positive malware detections.

In some embodiments, the security server 110 uses the results of the analyses conducted by the analysis module 122 to directly convict files as malicious. In other embodiments, the results are used in combination with other factors, such as file reputations, endpoint hygiene, and behavior-based heuristics, to convict files as malicious. For example, the security server 110 can use the results from the analysis module 122 as one of multiple features in a classifier for detecting malware.

Thus, the security server 110 uses the file descriptions received from the security modules 116 of the endpoints 112 to determine whether particular files contain malware. This approach, based on an analysis of the names used for a file, works well with files that have a low prevalence, i.e., the approach identifies malware seen on very few endpoints 112. In addition, this approach uses only a minimal amount of data collection and is not computationally complex. Hence, the approach can scale to a large number of endpoints 112.

Figure 2:
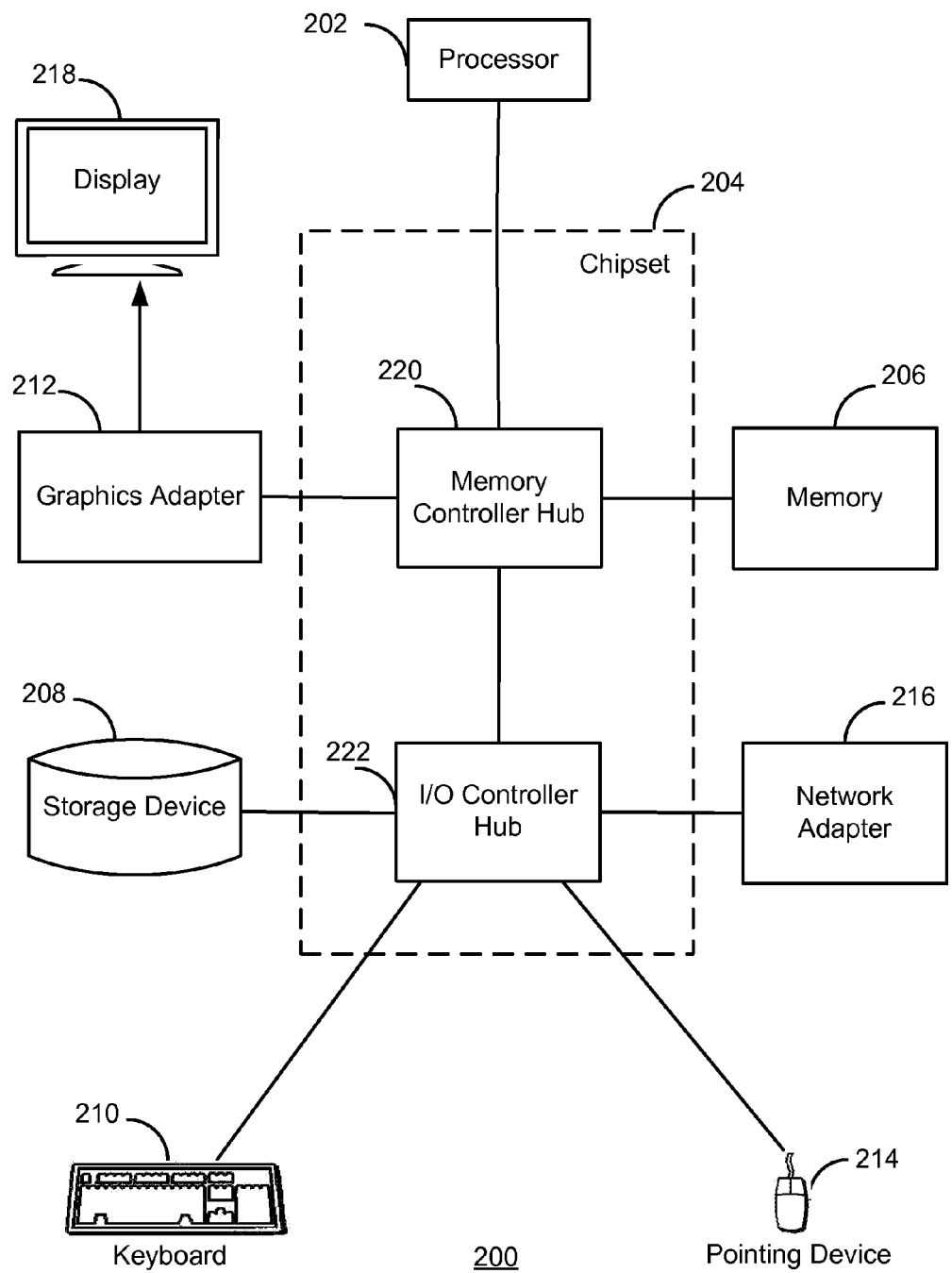
FIG. 2 is a high-level block diagram illustrating a typical computer for use as a security server or endpoint.

FIG. 2 is a high-level block diagram illustrating a typical computer 200 for use as a security server 110 or endpoint 112. Illustrated are a processor 202 coupled to a chipset 204. Also coupled to the chipset 204 are a memory 206, the storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to the network 114.

As is known in the art, a computer 200 can have different and/or other components than those shown in FIG. 2. In addition, the computer 200 can lack certain illustrated components. In one embodiment, a computer 200 acting as a security server 110 lacks a keyboard 210, pointing device 214, graphics adapter 212, and/or display 218. Moreover, the storage device 208 can be local and/or remote from the computer 200 (such as embodied within a storage area network (SAN)).

The computer 200 executes one or more operating systems such as a variant of MICROSOFT WINDOWS, UNIX, or LINUX. The operating system uses a file system to access files stored on the storage device 208. While file systems vary, most file systems organize the storage device 208 into a set of hierarchical directories and store the files within the directories. A "path" of a file specifies the directory in which the file is stored, and the directory's location within the hierarchy. For example, the path "C:\WINDOWS\Temp\tempfile.exe" indicates that the file "tempfile.exe" is stored in the "Temp" directory. The "Temp" directory is located beneath the "WINDOWS" directory which, in turn, is located beneath the "C:\" directory in the hierarchy. The file name, e.g., "tempfile.exe" is specified as a string of characters. The file system also maintains other attributes of the file, such as its size, file type, time of creation, and contents.

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202. Other embodiments can include other and/or different modules than the ones described here. In addition, the functionalities attributed to the modules can be performed by other or different modules in other embodiments.

Figure 3:
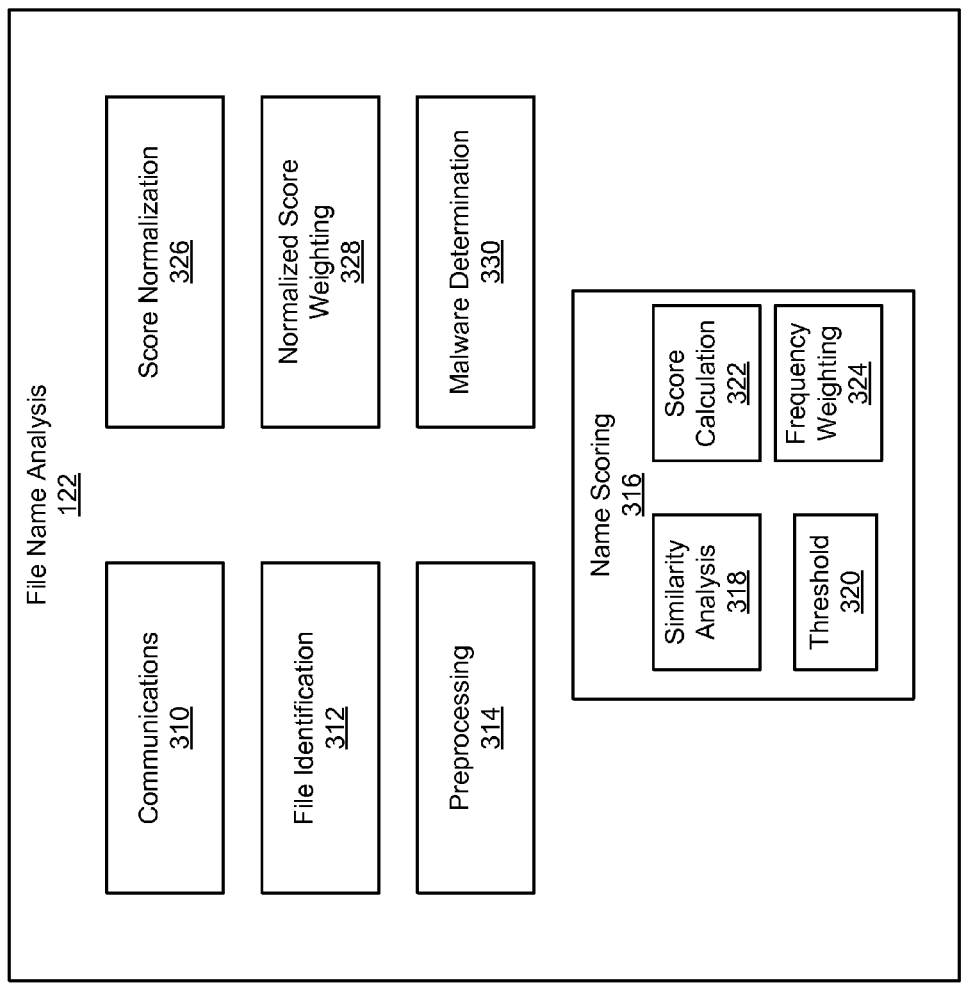
FIG. 3 is a high-level block diagram illustrating a detailed view of the analysis module of the security server according to one embodiment.

FIG. 3 is a high-level block diagram illustrating a detailed view of the analysis module 122 of the security server 110 according to one embodiment. As shown in FIG. 3, the analysis module 122 itself includes multiple modules.

A communications module 310 communicates with the security modules 116 executing on the endpoints 112. The communications module 310 receives the descriptions of files detected at the endpoints 110 and stores the descriptions in the file information database 120. In addition, the communications module 310 provides information such as indications of whether particular files contain malware to the security modules 116.

A file identification module 312 identifies files having multiple names. In one embodiment, the file identification module 312 analyzes the unique file identifiers to identify the set of unique files detected at the endpoints 112. For a unique file, as identified by its identifier, the file identification module 312 identifies the set of file names used for that file. For example, the file identification module 312 can determine that the same unique identifier for a file was received from 240 different endpoints 112. The file identification module 312 can also determine that the 240 instances of the file collectively had N (e.g., 1-240) different names. Of the 240 instances, there might be, e.g., 238 instances having the same name and 2 instances with different names, or, e.g., there might be 240 unique file names among the 240 instances of the file.

For the remainder of the discussion of FIG. 3, assume that the analysis module 122 is analyzing the set of N names of a single file identified by the file identification module 312. It will be understood that the file name analysis module 122 can perform the analysis for each unique file identified by the file identification module 312.

A preprocessing module 314 preprocesses the names of the file to account for name differences unlikely to have been caused by malware. Since the file name analysis is based on a presumption that multiple dissimilar names for a file can indicate that the file contains malware, false positive malware detections can be reduced by accounting for differences unlikely to have been caused by malware. To this end, the preprocessing module 314 canonicalizes the names to place them in a standard representation. In one embodiment, the preprocessing module 314 performs case conversion on the names so that all of the characters in the names have the same case.

In addition, the preprocessing module 314 applies heuristics to the names to account for differences introduced by the environments of the various endpoints 112. One heuristic considers a pair of names to be equivalent if the length of their common prefix is greater than a specified threshold, e.g., "logitechdesktopmessenger.exe" and "logit~.exe" can be considered equivalent. Another heuristic identifies, and treats as equivalent, acronym and non-acronym-based versions of the same name, e.g., "oda.exe" and "office desktop assistant.exe." Similarly, other heuristics identify and treat as equivalent reordered versions of the same name, e.g., "camerafix.exe" and "fixcamera.exe," identify names that are synonyms, e.g., "fios.exe" and "dsl.exe," identify names that contain a common suffix, e.g., "libmplayer.dll" and "codecslibmplayer.dll," and identify names that are identical but for the occurrence of a common phrase, e.g., "asusdvd.exe" and "powerdvd.exe."

Another heuristic applied by the preprocessing module 314 treats as equivalent file names known to have been automatically generated by the operating system or by legitimate application programs. This heuristic analyzes the paths for the file to identify instances of the file located in certain directories known to have automatically-assigned file names. For example, the side-by-side and System Volume Information directories used by the WINDOWS operating system are automatically generated and populated with files. These directories can legitimately include different file names for the same file on different endpoints 112. Hence, the heuristic applied by the preprocessing module 314 treats different instances of the same file found in these directories as if they have the same file name.

A name scoring module 316 analyzes the dissimilarity of the preprocessed file names in the set of N names for the file. In one embodiment, the name scoring module compares each pair of file names in the set and produces a weighted similarity score indicating the amount of dissimilarity between the names in the pair. For pairs of file names recognized by the preprocessing module 314 as equivalent, the name scoring module can omit the analyses described below and produce a score indicating that the names are similar.

A similarity analysis module 318 compares a pair of file names and determines the dissimilarity of the character strings forming the names. In one embodiment, the similarity analysis module 318 measures character alignment similarity, phrase similarity, and character position similarity. These aspects can be measured by applying one or more separate metrics to the file names. In one embodiment each metric applied by the similarity analysis module 318 produces a score indicating the measure of dissimilarity as determined by that metric.

For example, the Monge-Elkan metric can be used to determine the edit distance between the pair of names. The Cosine Similarity metric can be used to determine the similarity of phrases (tokens) found in the names. In addition, the Jaro-Wrinkler distance metric can be used to determine the character position similarity of the two file names. Other embodiments use different and/or additional metrics.

A threshold module 320 receives the scores produced by the metrics applied by the similarity analysis module 318 and uses a threshold to quantize each score to a binary value indicating similarity or dissimilarity. The threshold module 320 sets the threshold value based on the paths of the files having the particular names being compared. Files having certain paths (i.e., in certain directories) are expected to have the same name across all endpoints 112. For example, a file found in the "Program Files" directories of endpoints 112 using the WINDOWS operating system is expected to have the same name across the endpoints since the name is usually set by an installation program and rarely modified by the end-users. In contrast, the name of a file found in the "TEMP" directory of the endpoints can be expected to vary across the endpoints. The TEMP directory is often used as a temporary "scratch pad" by applications, and an application might legitimately use different names for the same file on different endpoints 112.

To set the threshold, the threshold module 320 determines the paths of the two file instances corresponding to the file names being compared. If both file instances are in directories where the file names are expected to be the same, the threshold module 320 sets the threshold so that a small amount of dissimilarity in the file names will quantize the metric scores to indicate dissimilarity. If at least one of the file instances is in a directory where file names can differ for legitimate reasons, the threshold module 320 sets the threshold so that only a large amount of dissimilarity will quantize the metric scores to indicate dissimilarity. In one embodiment, the quantizing process is omitted and the raw scores produced by the metrics are used in subsequent analyses.

A score calculation module 322 receives the quantized scores for the various metrics applied to the pair of file names and combines the scores into a similarity score for the pairing. In one embodiment, the score calculation module 322 combines the quantized scores by computing the mean score. Thus, if there are three scores {0, 0, 1}, the score calculation module 322 calculates the similarity score as (0+0+1)/3 to produce a score of 0.33. In another embodiment, the score calculation module 322 computes the similarity score by summing the quantized scores.

A frequency weighting module 324 weights the similarity score for the pair of names based on the frequency distribution of the file names, where a file name's frequency is measured by the number of endpoints 112 on which an instance of the file having the given name is found. This weight indicates an amount of confidence that the different names were intentionally produced by the file having the names, and not by other factors. File names produced by malware are expected to have a uniform random distribution. File names produced by other factors, such as accidental renaming by an end-user or a malicious attempt to game the security server 110, are expected to have a skewed distribution.

In one embodiment, the weighting is determined by two components: 1) the percentage of the total names for the file represented by the two names being compared; and 2) the difference in the percentage of the total names for the file between the two names being compared. If the first component indicates that the two names form a relatively a small percentage of the total names for the file, and the second component indicates that the two names each represent roughly the same overall percentage of the total names, then this finding suggests a random distribution of the file names. Therefore, the similarity score is given a relatively high weight to indicate a high confidence. In contrast, if the first component indicates that the two names form a relatively large percentage of the total names for the file, or the second component indicates that one of the names represents a larger percentage of the whole than the other name, then this finding suggests that the names are not evenly distributed. Accordingly, the similarity score is given a relatively low weight to indicate a low confidence. The weight can be, for example, a value between zero and one that is multiplied by the similarity score to produce the weighted similarity score.

A score normalization module 326 produces a normalized score indicating the dissimilarity of the file names for a file. Recall that the name scoring module 316 compares each pair of file names for a file and produces a weighted similarity score for each pair. The normalization module 326 combines these weighted similarity scores into a single normalized score for the file. One embodiment of the normalization module 326 calculates the normalized score as the mean of the weighted similarity scores. Hence, the normalized score is the sum of the weighted similarity scores divided by the number of scores. Other embodiments calculate the normalized score in other ways.

A normalized score weighting module 328 weights the normalized score to account for the age and/or prevalence of the file and produces a weighted normalized score. Depending upon the embodiment, a single weight that represents the combination of the age and prevalence of the file, or separate weights, can be used. The weighted normalized score is a value indicating the confidence that the associated file contains malware. The weight can be, for example, a value between and including zero and one that is multiplied by the normalized score to produce the weighted normalized score. This weighting serves to reduce false positive malware detections.

"Age," as used herein, refers to the time elapsed from the earliest detection of the file at an endpoint 112 to the current time. A new file with multiple names detected on the endpoints 112 is more likely to be malicious than an older file that was recently detected under a new name. Therefore, the normalized score for the file is given a weight inversely proportional to its age.

"Prevalence," as used herein, refers to the distribution of the file across the endpoints 112. A file with high prevalence, i.e., is found on many of the endpoints 112, is unlikely to be malicious. Hence, the normalized score weighting module 328 assigns the score for the file a weight inversely proportional to its prevalence. In one embodiment, the normalized score weighting module 328 uses a threshold that causes the analysis module 122 to not convict a file as malware if the file's prevalence exceeds the threshold. For example, a zero weight can be applied if the prevalence exceeds the threshold.

A malware determination module 330 determines whether the file contains malware based on the weighted normalized score. In one embodiment, the malware determination module 330 applies a threshold to the score. If the score exceeds the threshold, the malware determination module 330 convicts the file as containing malware. If the score is below the threshold, the malware determination module 330 does not convict the file, although the file could still be found to contain malware based on other analyses and/or a combination of the weighted normalized score and other analyses.

In one embodiment, the value of the threshold applied by the malware determination module 330 is determined by applying the analysis described above to known malicious and legitimate files and evaluating those files' scores. For example, the data in the file information database 120 can be examined to extract names and other attributes for files that are known to be malicious or legitimate due to a manual analysis and/or a determination using another technique. The data can be analyzed using the techniques described above to produce weighted normalized scores for the known files. The resulting scores can then be analyzed using manual or automated techniques to select a threshold value that accurately convicts malicious files without an excessive amount of false positive or false negative convictions.

Figure 4:
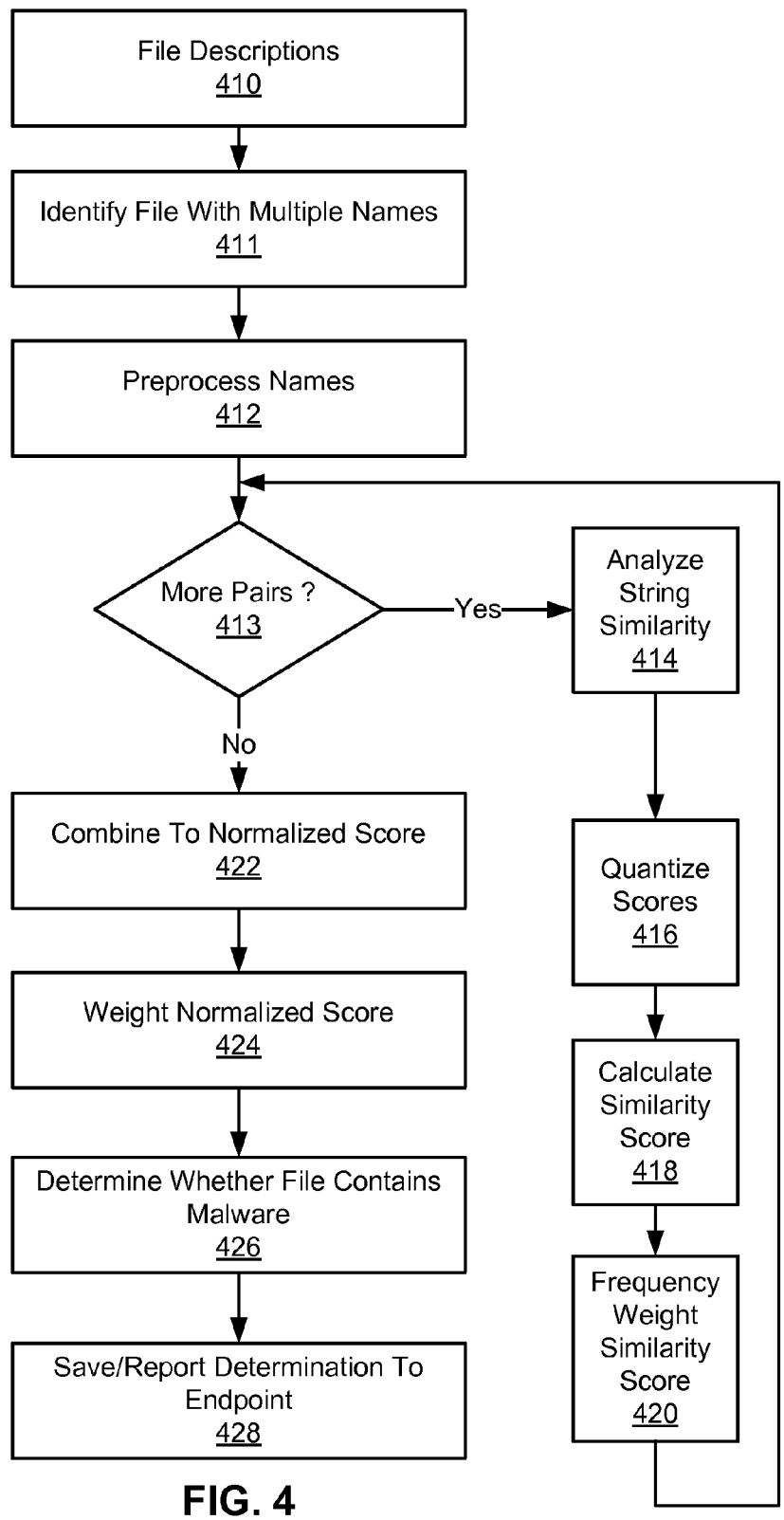
FIG. 4 is a flow chart illustrating steps performed by one embodiment of the analysis module to detect files containing malware.

FIG. 4 is a flow chart illustrating steps performed by one embodiment of the analysis module 122 to detect files containing malware. Other embodiments can perform different and/or additional steps. Moreover, other embodiments can perform the steps in different orders. Further, some or all of the steps can be performed by entities other than the analysis module 122.

The analysis module 122 receives 410 file descriptions from the security modules 116 of the endpoints 112 and/or other sources. The received descriptions specify the names and paths of the files, and also include unique identifiers of the files, such as cryptographic hashes. The analysis module 122 analyzes the descriptions to identify 411 a file that has multiple names across the endpoints 112.

The analysis module 122 identifies the set of names associated with the file and preprocesses 412 the names to account for name differences unlikely to have been caused by malware. The analysis module 122 also generates pairs of names such that each name is paired with each other name. For 413 each pair, the analysis module 122 analyzes 414 the string similarity between the names using one or more metrics. Each metric produces a score. The analysis module 122 quantizes 416 the scores of the metrics to binary values indicating whether the names are dissimilar. In one embodiment, the quantizing is performed by applying a threshold having a value determined based on the paths in which the file instances having the names being compared are located. The analysis module 122 combines the quantized scores to calculate 418 a similarity score for the pair of file names. This similarity score is then weighted 420 based on the frequency distribution of the file names.

If 413 all of the pairs of file names have been compared, the weighted similarity scores of the pairs are combined 422 into a normalized score. The analysis module 122 weights 424 the normalized score to account for the age and/or prevalence of the file to produce a weighted normalized score. The analysis module 122 applies a threshold to the weighted normalized score to determine 426 whether the file contains malware. The analysis module 122 saves 428 the determination to the file information database 120 and/or reports 428 the determination to the endpoints 112.

Figure 5:
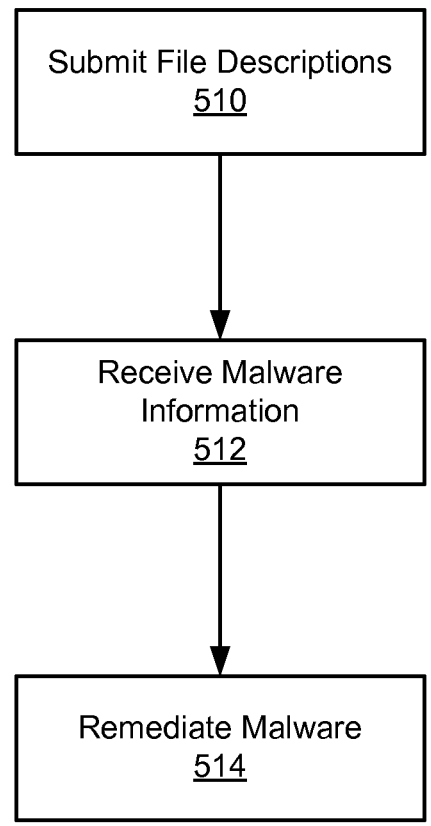
FIG. 5 is a flow chart illustrating steps performed by a security module executing at an endpoint according to one embodiment.

FIG. 5 is a flow chart illustrating steps performed by a security module 116 executing at an endpoint 112 according to one embodiment. Other embodiments can perform different and/or additional steps, or perform the steps in different orders. Further, some or all of the steps can be performed by entities other than the security module 116.

The security module 116 submits 510 descriptions of files detected at the endpoint 112 to the security server 110. Depending upon the embodiment, the security module 116 can submit descriptions of all files detected on the endpoint 112, or of only certain files such as executable files. The descriptions describe attributes including the name and path of the file, and a unique identifier of the file. The security module 116 receives 512, in return, malware determinations made by the security server 110. The security module 116 can receive the malware determination in response to a request from the security module 116 for the status of an identified file, as part of a scheduled update of malware detection data stored at the endpoint 112, and/or at another time. Assuming that the malware determination indicates than an identified file contains malware, the security module 116 remediates 514 the malware by, e.g., quarantining the file to prevent it from performing malicious actions, deleting the file, or reporting the malware to a user of the endpoint 112.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of determining whether a computer file contains malicious software, comprising:
   identifying a computer file stored on a plurality of different endpoints, the computer file having a plurality of different names on the endpoints;
   analyzing the plurality of different names for the computer file to generate a score, the score indicating a confidence that the computer file contains malicious software, wherein the analysis comprises:
      determining an amount of dissimilarity among the plurality of different names for the computer file by comparing pairs of different names for the computer file to determine dissimilarity of character strings forming the names in the pairs;
      generating the score responsive to the amount of dissimilarity among the plurality of different names for the computer file, wherein a greater amount of dissimilarity correlates with a greater confidence that the computer file contains malicious software; and
      weighting the score for age and/or prevalence of the computer file, wherein the age weight for the score is inversely proportional to a length of time that the computer file has been stored on an endpoint and the prevalence weight for the score is inversely proportional to a prevalence of the computer file among the plurality of different endpoints; and
   determining whether the computer file contains malicious software responsive at least in part to the score.

2. The method of claim 1, further comprising:
   receiving, from the plurality of different endpoints via a computer network, descriptions of computer files stored at the endpoints, the descriptions describing names, paths, and unique identifiers of the computer files; and
   identifying the computer file having the plurality of different names using the unique identifiers received from the plurality of different endpoints;

wherein the analyzing comprises analyzing the names and paths for the computer file to generate the score.

3. The method of claim 1, further comprising:
receiving, from the plurality of different endpoints via a computer network, descriptions of computer files stored at the endpoints, the descriptions describing names and unique identifiers of the computer files;
identifying the computer file having the plurality of different names using the unique identifiers received from the plurality of different endpoints; and
processing the plurality of different names to account for name differences unlikely to have been caused by malicious software by canonicalizing the plurality of different names into a standard representation;
wherein the analyzing analyzes the processed names.

4. The method of claim 1, wherein analyzing the plurality of different names for the computer file comprises:
for a pair of different names of the plurality of different names for the computer file:
applying a string similarity metric to the pair of different names, the metric producing a similarity score indicating a measure of dissimilarity between the pair of different names;
determining file system paths of endpoints on which instances of the file having a name from the pair of different names reside;
setting a threshold for the similarity score responsive to the file system paths; and
quantizing the similarity score for the metric to indicate either similarity or dissimilarity responsive to the threshold.

5. The method of claim 4, further comprising:
determining whether an instance of the file having a name from the pair of different names has a file system path to a directory in which file names are expected to vary across endpoints; and
setting the threshold to require a greater measure of dissimilarity to quantize the similarity score to indicate dissimilarity if the instance of the file having a name from the pair of different names has a file system path to a directory in which file names are expected to vary across endpoints than if the instance of the file having a name from the pair of different names has a file system path to a directory in which file names are not expected to vary across endpoints.

6. The method of claim 1, wherein analyzing the plurality of different names for the computer file comprises:
for a pair of different names of the plurality of different names for the computer file:
applying a string similarity metric to the pair of different names, the metric producing a similarity score indicating a measure of dissimilarity between the pair of different names; and
weighting the similarity score responsive to a frequency distribution of instances of the computer file having a name of the pair of different names among the plurality of endpoints, wherein the similarity score receives a higher weight if a frequency distribution evidences a uniform random distribution of file names among the endpoints than if the frequency distribution evidences a different distribution.

7. The method of claim 1, wherein the analysis further comprises:
applying a plurality of metrics to a compared pair of different names of the plurality of different names to generate a plurality of metric scores;
quantizing each of the plurality of metric scores to a binary value indicating similarity or dissimilarity to produce a plurality of quantized scores; and
combining the plurality of quantized scores to produce a similarity score for the compared pair of different names, wherein the score indicating the confidence that the computer file contains malicious software is generated responsive to the similarity score.

8. The method of claim 1, wherein the analysis further comprises:
generating a similarity score responsive to a comparison of a pair of different names of the plurality of different names;
weighting the similarity score based on a frequency distribution of the names in the pair to produce a weighted similarity score;
combining the weighted similarity score with other weighted similarity scores to produce a normalized score; and
producing the score indicating the confidence that the computer file contains malicious software using the normalized score.

9. The method of claim 8,
wherein the normalized score is weighted to account for the age and/or prevalence of the file.

10. A computer system for determining whether a computer file contains malicious software, comprising:
a non-transitory computer-readable storage medium storing executable computer program instructions comprising instructions for:
identifying a computer file stored on a plurality of different endpoints, the computer file having a plurality of different names on the endpoints;
analyzing the plurality of different names for the computer file to generate a score, the score indicating a confidence that the computer file contains malicious software, wherein the analysis comprises:
determining an amount of dissimilarity among the plurality of different names for the computer file by comparing pairs of different names for the computer file to determine dissimilarity of character strings forming the names in the pairs;
generating the score responsive to the amount of dissimilarity among the plurality of different names for the computer file, wherein a greater amount of dissimilarity correlates with a greater confidence that the computer file contains malicious software; and
weighting the score for age and/or prevalence of the computer file, wherein the age weight for the score is inversely proportional to a length of time that the computer file has been stored on an endpoint and the prevalence weight for the score is inversely proportional to a prevalence of the computer file among the plurality of different endpoints; and
determining whether the computer file contains malicious software responsive at least in part to the score; and
a processor for executing the computer program instructions.

11. The computer system of claim 10, further comprising instructions for:
receiving, from the plurality of different endpoints via a computer network, descriptions of computer files stored at the endpoints, the descriptions describing names, paths, and unique identifiers of the computer files; and identifying the computer file having the plurality of different names using the unique identifiers received from the plurality of different endpoints;

wherein the analyzing comprises analyzing the names and paths for the computer file to generate the score.

12. The computer system of claim 10, further comprising instructions for:

receiving, from the plurality of different endpoints via a computer network, descriptions of computer files stored at the endpoints, the descriptions describing names and unique identifiers of the computer files;

identifying the computer file having the plurality of different names using the unique identifiers received from the plurality of different endpoints; and processing the plurality of different names to account for name differences unlikely to have been caused by malicious software by canonicalizing the plurality of different names into a standard representation;

wherein the analyzing analyzes the processed names.

13. The computer system of claim 10, wherein analyzing the plurality of different names for the computer file comprises:

for a pair of different names of the plurality of different names for the computer file:

applying a string similarity metric to the pair of different names, the metric producing a similarity score indicating a measure of dissimilarity between the pair of different names;

determining file system paths of endpoints on which instances of the file having a name from the pair of different names reside;

setting a threshold for the similarity score responsive to the file system paths; and quantizing the similarity score for the metric to indicate either similarity or dissimilarity responsive to the threshold.

14. The computer system of claim 13, further comprising instructions for:

determining whether an instance of the file having a name from the pair of different names has a file system path to a directory in which file names are expected to vary across endpoints; and setting the threshold to require a greater measure of dissimilarity to quantize the similarity score to indicate dissimilarity if the instance of the file having a name from the pair of different names has a file system path to a directory in which file names are expected to vary across endpoints than if the instance of the file having a name from the pair of different names has a file system path to a directory in which file names are not expected to vary across endpoints.

15. The computer system of claim 10, wherein analyzing the plurality of different names for the computer file comprises:

for a pair of different names of the plurality of different names for the computer file:

applying a string similarity metric to the pair of different names, the metric producing a similarity score indicating a measure of dissimilarity between the pair of different names; and weighting the similarity score responsive to a frequency distribution of instances of the computer file having a name of the pair of different names among the plurality of endpoints, wherein the similarity score receives a higher weight if a frequency distribution evidences a uniform random distribution of file names among the endpoints than if the frequency distribution evidences a different distribution.

16. A non-transitory computer-readable storage medium storing executable computer program instructions for determining whether a computer file contains malicious code, the instructions comprising instructions for:

submitting file descriptions describing attributes of computer files detected on an endpoint to a security server, the attributes comprising unique identifiers of the computer files and names of the computer files;

receiving, from the security server, an indication of whether a computer file contains malicious software, the indication determined responsive to an analysis of unique identifiers and names of computer files described by file descriptions submitted by a plurality of different endpoints, wherein the analysis comprises:

determining an amount of dissimilarity among a plurality of different names for the computer file by comparing pairs of different names for the computer file to determine dissimilarity of character strings forming the names in the pairs;

generating a score responsive to the amount of dissimilarity among the plurality of different names for the computer file, wherein a greater amount of dissimilarity correlates with a greater confidence that the computer file contains malicious software; and weighting the score for age and/or prevalence of the computer file, wherein the age weight for the score is inversely proportional to a length of time that the computer file has been on an endpoint of the plurality of different endpoints and the prevalence weight for the score is inversely proportional to a prevalence of the computer file among the plurality of different endpoints, and the indication is determined responsive to the weighted score; and responsive to the received indication indicating that the computer file contains malicious software, remediating the malicious software.

17. The computer-readable storage medium of claim 16, wherein the analysis further comprises:

for a pair of different names of the plurality of different names for the computer file:

applying a string similarity metric to the pair of different names, the metric producing a similarity score indicating a measure of dissimilarity between the pair of different names; and quantizing the similarity score for the metric to indicate either similarity or dissimilarity.

* * * * *